United States Patent
Wirtanen et al.

(10) Patent No.: US 11,552,902 B2
(45) Date of Patent: *Jan. 10, 2023

(54) MANAGING CONNECTION RETRIES DUE TO ACCESS CLASS BARRING

(71) Applicant: BlackBerry Limited, Waterloo (CA)

(72) Inventors: Jeffrey William Wirtanen, Ottawa (CA); Muhammad Khaledul Islam, Ottawa (CA)

(73) Assignee: BlackBerry Limited, Waterloo (CA)

(*) Notice: Subject to any disclaimer, the term of this patent is extended or adjusted under 35 U.S.C. 154(b) by 228 days.

This patent is subject to a terminal disclaimer.

(21) Appl. No.: 15/078,815

(22) Filed: Mar. 23, 2016

(65) Prior Publication Data
US 2016/0205040 A1    Jul. 14, 2016

Related U.S. Application Data

(63) Continuation of application No. 14/106,472, filed on Dec. 13, 2013, now Pat. No. 9,326,311.

(51) Int. Cl.
*H04L 47/70* (2022.01)
*H04W 8/30* (2009.01)
(Continued)

(52) U.S. Cl.
CPC .......... *H04L 47/826* (2013.01); *H04J 11/00* (2013.01); *H04W 4/12* (2013.01); *H04W 8/30* (2013.01); *H04W 36/0022* (2013.01); *H04W 48/06* (2013.01); *H04W 52/0212* (2013.01); *H04W 52/0229* (2013.01); *H04W 76/18* (2018.02);
(Continued)

(58) Field of Classification Search
CPC ........ H04L 47/00; H04W 76/00; H04W 8/00; H04W 80/00; H04W 36/00; H04W 4/00; H04J 11/00
See application file for complete search history.

(56) References Cited

U.S. PATENT DOCUMENTS 9,326,311 B2 * 4/2016 Wirtanen .......... H04W 52/0212
2006/0114821 A1 * 6/2006 Willey ............... H04L 47/266
370/229
(Continued)

FOREIGN PATENT DOCUMENTS

CN    101801045    8/2010
CN    103168496    6/2013
(Continued)

OTHER PUBLICATIONS

3GPP TS36.331 V11.5.0 (Sep. 2013).
(Continued)

*Primary Examiner* — Jung H Park
*Assistant Examiner* — Sumitra Ganguly
(74) *Attorney, Agent, or Firm* — Fish & Richardson P.C.

(57) ABSTRACT

In some implementations, a method includes receiving a connection request from a user application. A service request is sent to a radio resource control (RRC) module. An indication of failure of or a rejection to the service request due to access class barring is received from the RRC module. A retry of the user application connection request is prevented until expiration of an access-class-barring timer of the RRC module that resulted in the access class barring.

13 Claims, 7 Drawing Sheets (51) Int. Cl.
*H04W 80/04* (2009.01)
*H04J 11/00* (2006.01)
*H04W 36/00* (2009.01)
*H04W 4/12* (2009.01)
*H04W 52/02* (2009.01)
*H04W 76/18* (2018.01)
*H04W 76/27* (2018.01)
*H04W 48/06* (2009.01)
*H04W 88/02* (2009.01)
*H04W 88/08* (2009.01)
*H04W 88/14* (2009.01)
*H04W 72/04* (2009.01)

(52) U.S. Cl.
CPC ........... *H04W 76/27* (2018.02); *H04W 80/04* (2013.01); *H04W 72/042* (2013.01); *H04W 72/0413* (2013.01); *H04W 88/02* (2013.01); *H04W 88/08* (2013.01); *H04W 88/14* (2013.01); *Y02D 30/70* (2020.08)

(56) References Cited

U.S. PATENT DOCUMENTS

| | | | |
|---|---|---|---|
| 2010/0099402 A1 | 4/2010 | Wu | |
| 2010/0184448 A1* | 7/2010 | Wu | H04W 76/02 455/450 |
| 2010/0190499 A1* | 7/2010 | Wu | H04W 36/14 455/436 |
| 2011/0199898 A1* | 8/2011 | Cho | H04W 48/06 370/230 |
| 2012/0008573 A1 | 1/2012 | Shiva et al. | |
| 2012/0040643 A1* | 2/2012 | Diachina | H04W 4/70 455/411 |
| 2012/0170503 A1* | 7/2012 | Kelley | H04W 48/06 370/312 |
| 2012/0269122 A1 | 10/2012 | Lee | |
| 2012/0302950 A1 | 11/2012 | Landsman et al. | |
| 2013/0028184 A1* | 1/2013 | Lee | H04W 48/02 370/328 |
| 2013/0100795 A1* | 4/2013 | Zhao | H04W 36/0016 370/216 |
| 2013/0122906 A1 | 5/2013 | Klatt | |
| 2013/0201870 A1* | 8/2013 | Gupta | H04W 8/20 370/254 |
| 2013/0294396 A1* | 11/2013 | Iwamura | H04W 72/04 370/329 |
| 2014/0136709 A1* | 5/2014 | Chin | H04W 4/12 709/226 |
| 2014/0307720 A1* | 10/2014 | Koslela | H04W 48/02 370/336 |
| 2015/0004924 A1 | 1/2015 | Kim | |
| 2015/0009816 A1* | 1/2015 | Hsu | H04W 28/0221 370/230.1 |
| 2015/0173119 A1 | 6/2015 | Wirtanen et al. | |

FOREIGN PATENT DOCUMENTS

| | | |
|---|---|---|
| CN | 103299704 | 9/2013 |
| WO | 2013/023608 | 2/2013 |
| WO | 2013/025148 | 2/2013 |
| WO | 2013/112019 | 8/2013 |

OTHER PUBLICATIONS

3GPP TS22.011 V11.3.0 (Mar. 2013).
International Search Report and Written Opinion in International Application No. PCT/CA2014/051203, dated Feb. 27, 2015, 7 pages.
Extended European Search Report issued in European Application No. 14869170.2 dated Oct. 24, 2016.
European Examination Report issued in European Application No. 14869170.2 dated Feb. 1, 2018, 7 pages.
Chinese Office Action issued in Chinese Application No. 201480067637.0 dated Dec. 20, 2018, 13 pages.
Extended European Search Report issued in European Application No. 19209005.8 dated Dec. 4, 2019, 9 pages.
Chinese Office Action issued in Chinese Application No. 201480067637.0 dated May 28, 2019, 8 pages (With English Translation).
Chinese Notice of allowance issued in Chinese Application No. 201480067637.0 dated Aug. 21, 2019, 4 pages (With English Translation).
Examiner's Report issued in Canada Application No. 2933266 dated Jan. 19, 2021, 4 pages.

* cited by examiner

MANAGING CONNECTION RETRIES DUE TO ACCESS CLASS BARRING

CROSS REFERENCE TO RELATED APPLICATION

This patent is a continuation of U.S. application Ser. No. 14/106,472, filed Dec. 13, 2013, and issued as U.S. Pat. No. 9,326,311, the entire contents of which is hereby expressly incorporated by reference herein in its entirety.

TECHNICAL FIELD

This invention relates to managing connection retries due to access class barring.

BACKGROUND

To manage network load, long term evolution (LTE) networks may access bar cells for UEs of specific access classes (ACs) or types of mobile originated (MO) traffic at the radio resource control (RRC) layer. For example, a network can prevent or restrict wireless devices from attempting to access the network by broadcasting access restriction parameters via 'System information', such as Master Information Block (MIB) and System Information Block type k (k=1, 2, . . . ). Specifically, the LTE network can restrict access for certain classes of UEs using control information for Access Class Barring (ACB), Service Specific Access Class Barring (SSAC) and Extended Access Barring (EAB). For ACB, a SIB2 may include ACB parameters for at least one of Emergency, MO data, Circuit-switched Fallback (CSFB), and MO signaling. The parameters for CSFB, MO-Data and MO-Signaling include a probability factor and a barring time for AC 0-9 and barring bits for access classes 11-15. For AC 0-9, if the UE initiates an MO call and the relevant parameters are included for the type of call, the UE generates a random number if the relevant access class barring timer is not already running. If the drawn number is lower than the value indicated by the probability, the UE may attempt to access the network. Otherwise, the UE is barred from attempting to access the network for a duration which is randomly selected based on the broadcasted barring time value.

If access barring is configured by the network, the SIB2 includes relevant parameters such as type of connection request for which barring is in effect and associating barring time. Examples of types of connections which may be barred along with barring time are ac-BarringForEmergency, ac-BarringForMO-Data (T303), ac-BarringForCSFB (T306/T303), and ac-BarringForMO-Signalling (T305). In summary, the access classing configuration specifies a probability of barring (ac-BarringFactor) the call origination on the user equipment (UE) and a formula to generate the timeout value before calls can be attempted, i.e., a new random number is generated and compared to the probability.

DESCRIPTION OF DRAWINGS

Like reference symbols in the various drawings indicate like elements.

DETAILED DESCRIPTION

The present disclosure is directed to managing a retry of a connection request for a user application due to LTE access class barring. For example, the non-access stratum (NAS) module or the user application may prevent a retry of a connection request until after expiration of an access-class-barring timer. In these instances, the NAS module or the user application may substantially align a retry timer for a user application with the access-barring-class timer for a radio resource control (RRC) module. In doing so, the NAS module or the user application may improve the access time to the network by aligning the retry with at the expiry of the the access barring timer and also reduce power consumption by preventing a retryunnecessary futile retry attempts between NAS or application layer and RRC layer before expiration of the access-class-barring timer. In some implementations, a user application sends a connection request to the NAS module. A user application can include a data application, a short message service (SMS) application, a voice application, or other applications. In response, the NAS module can transmit a connection establishment request to the RRC module if the appropriate access class barring is not already active. In some instances, the NAS module may determine the type of MO traffic for the user application and indicate the traffic type to the RRC module. For example, the NAS module may indicate that the MO traffic request is for a circuit-switched voice call or a Voice over LTE (VoLTE) call. The RRC module executes an access-class-barring check or determines whether an access-class-barring timer is currently active. If the check fails or the timer is active, the RRC module notifies the NAS module of a failure of or a rejection to the connection establishment request due to access class barring. To substantially prevent a subsequent retry to be performed too soon or too late, the NAS module or the user application refrains sending a subsequent retry until at least expiration of the access-class-barring timer. In some instances, the NAS module or the user application substantially aligns the retry timer for the user application to the access-class-barring timer that resulted in the access class barring.

In some implementations, the timers can be substantially aligned using one or more of the following: directly informing the user application when the access-class-barring timer will expire by either the NAS module or the RCC module; having the user application request the timeout value directly from the RRC module or the RCC via the NAS module; in response to expiration of the timer, automatically triggering a retry of the connection request; or others. For barring due to MO data, the retry timer can be substantially aligned with T303. For barring due to CSFB, the retry timer can be substantially aligned with T306 and T303. For barring due to MO signaling, the retry timer can be substantially aligned with T305. In doing so, the user application matches the countdown of the retry timer to the countdown of the access-class-barring timer.

Figure 1:
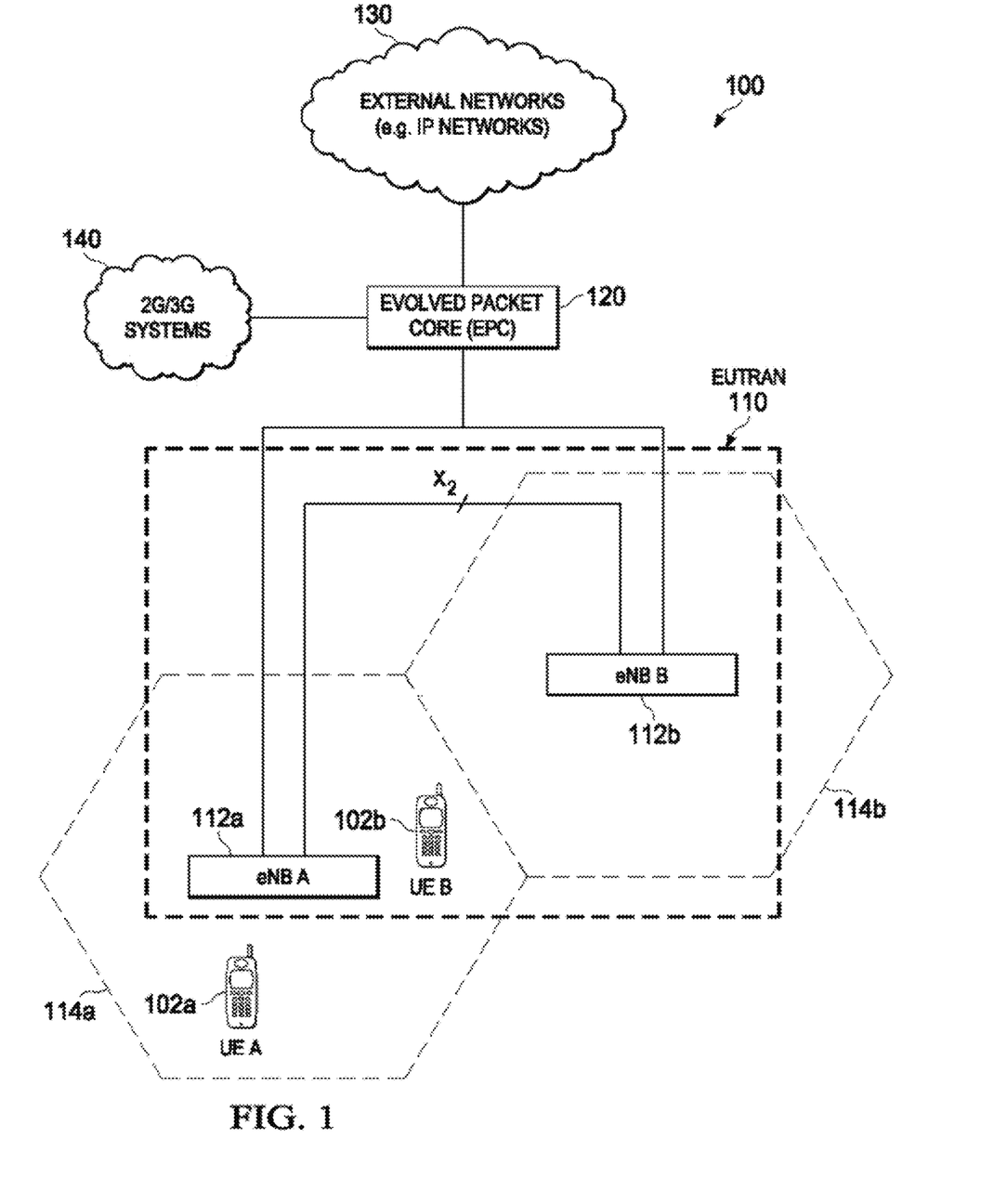
FIG. 1 is a schematic block diagram of an example mobile communication.

FIG. 1 is a schematic block diagram of an example mobile communication system 100. The mobile communication system 100 shown in FIG. 1 may include one or more network nodes (e.g., 112a and 112b). The network nodes may take several forms in a mobile communication system, such as (but not limited to) an evolved Node B (eNB), a base station, a Node B, a wireless access point, a radio network controller, a base transceiver station, a layer two relay node, a layer three relay node, a femto cell, home eNB (HeNB), a home Node B (HNB), a base station controller, or other network node that includes radio resource control. In the LTE example of FIG. 1, the network nodes are eNBs 112a and 112b. The example mobile communication system 100 of FIG. 1 may include one or more radio access networks 110, core networks (CNs) 120, and external networks 130. In some implementations, the radio access networks 110 may be an evolved-UMTS terrestrial radio access networks (E-UTRAN). In addition, in certain instances, the core networks 120 may be evolved packet cores (EPCs). Further, there may be one or more mobile electronic devices 102a, 102b operating within the mobile communication system 100. In some implementations, 2G/3G systems 140 may be a Global System for Mobile communication (GSM), Interim Standard 95 (IS-95), Universal Mobile Telecommunications System (UMTS), or a CDMA2000 (Code Division Multiple Access) and also integrated into the mobile communication system 100.

As illustrated, the radio access network 110 includes eNB 112a and eNB 112b. Cell 114a is the service area of eNB 112a, and Cell 114b is the service area of eNB 112b. In this example, UEs 102a and 102b operate in Cell 114a and are served by eNB 112a. The UEs 102a and 102b may be any electronic device used by an end-user to communicate, for example, within the mobile communication system 100. The UEs 102a and 102b may transmit voice data, video data, user data, application data, multimedia data, text, web content and/or any other content.

As previously mentioned, the UE 102a, 102b can include any hardware, software, firmware, or combination thereof to prevent a retry of a connection request until at least expiration an access-class-barring timer. For example, the UE 102a, 102b may substantially align a retry timer to an access-class-barring timer. In these instances, the timeout value for the access-class-barring timer to the application requesting the connection. The UE 102a, 102b may receive control information for Access Class Barring (ACB), Access Control for circuit-switched fallback (CSFB), or Extended Access Barring (EAB) via a SIB2. Based on the control information, the UE 102a, 102b can set an access-class-barring timer that prevents certain groups of UEs from attempting to access eNB 112a. A user application executing on the UE 102a, 102b may generate a connection request and receive a failure or rejection due to access class barring. In response to the access class barring, the UE 102a, 102b can prevent a retry of the RRC connection request until after expiration of the access-class-barring timer. For example, the UE 102a, 102b may substantially align the retry timer for the user application with the access-class-barring timer. Once the access-class-barring timer expires, the UE 102a, 102b can retry the connection request. Aligning the retry of the connection request and refraining attempts until expiration of the access-class-barring timer improves access time to the network and will save battery consumption and enhance user experience.

In general, the UE 102a or 102b may be referred to as mobile electronic device, user device, mobile station, subscriber station, portable electronic device, mobile communications device, wireless modem, or wireless terminal. Examples of a UE (e.g. UE 102a or 102b) may include a cellular phone, personal data assistant (PDA), smart phone, laptop, tablet personal computer (PC), pager, portable computer, portable gaming device, wearable electronic device, or other mobile communications device having components for communicating voice or data via a mobile communication network.

Other examples of a UE include, but are not limited to, a television, a remote controller, a set-top box, a computer monitor, a computer (including a tablet, a desktop computer, a handheld or laptop computer, a netbook computer), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. The UE 102a or 102b may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 102a or 102b may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

A radio access network is part of a mobile communication system which implements a radio access technology, such as UMTS, CDMA2000 and 3GPP LTE. For example, the radio access network (RAN) 110 included in an LTE telecommunication system is called an EUTRAN. The EUTRAN can be located between the UEs and core network 120 (e.g. an evolved core network, EPC). The EUTRAN includes at least one eNB. The eNB can be a radio base station that may control all or at least some radio related functions in a fixed part of the system. The at least one eNB can provide radio interface within their coverage area or a cell for the UEs to communicate. The eNBs may be distributed throughout the cellular network to provide a wide area of coverage. The eNBs directly communicate with one or more UEs, other eNBs, and the core network.

Once the eNB 112a determines that network congestion or capacity has exceeded a threshold, the eNB 112a 102b may broadcast a SIB2 including control information for at least one of Access Class Barring (ACB), Access Control for circuit-switched fallback (CSFB), or Extended Access Barring (EAB). The control information prevents certain groups of UEs, i.e., access classes (ACs), from attempting to access the eNB 112a for a certain period of time. For example, the control information can include at least one of ac-BarringForMO-Data (T303), ac-BarringForCSFB (T306/T303), and ac-BarringForMO-Signalling (T305). For any of the classes, the control information specifies a probability of barring the connection and a formula to generate the timeout value before a connection can be attempted.

In general, the eNBs 112a and 112b may be the end point of the radio protocols towards the UEs 102a, 102b and may relay signals between the radio connection and the connectivity towards the core network 120. In certain implementations, the EPC may be the main component of a core network 120. The core network 120 may include a backbone network, which may be a central part of the mobile communication system 100. The core network 120 may include other components, such as (but not limited to) a mobility management entity (MME), a serving gateway (SGW), and/or a packet data network gateway (PGW). The MME may be the main control element in the core network 120 responsible for the functionalities comprising the control plane functions related to subscriber and session management. The SGW can serve as a local mobility anchor, such that the packets are routed through this point for intra radio access network 110 (e.g. intra-EUTRAN) mobility and mobility with other legacy 2G/3G systems 140. The SGW functions may include the user plane tunnel management and switching. The PGW may provide connectivity to the services domain comprising external networks 130, such as the IP networks. The UEs 102a, 102b, radio access network 110 (e.g. EUTRAN), and core network 120 (e.g EPC) are sometimes referred to together as the evolved packet system (EPS).

Figure 2:
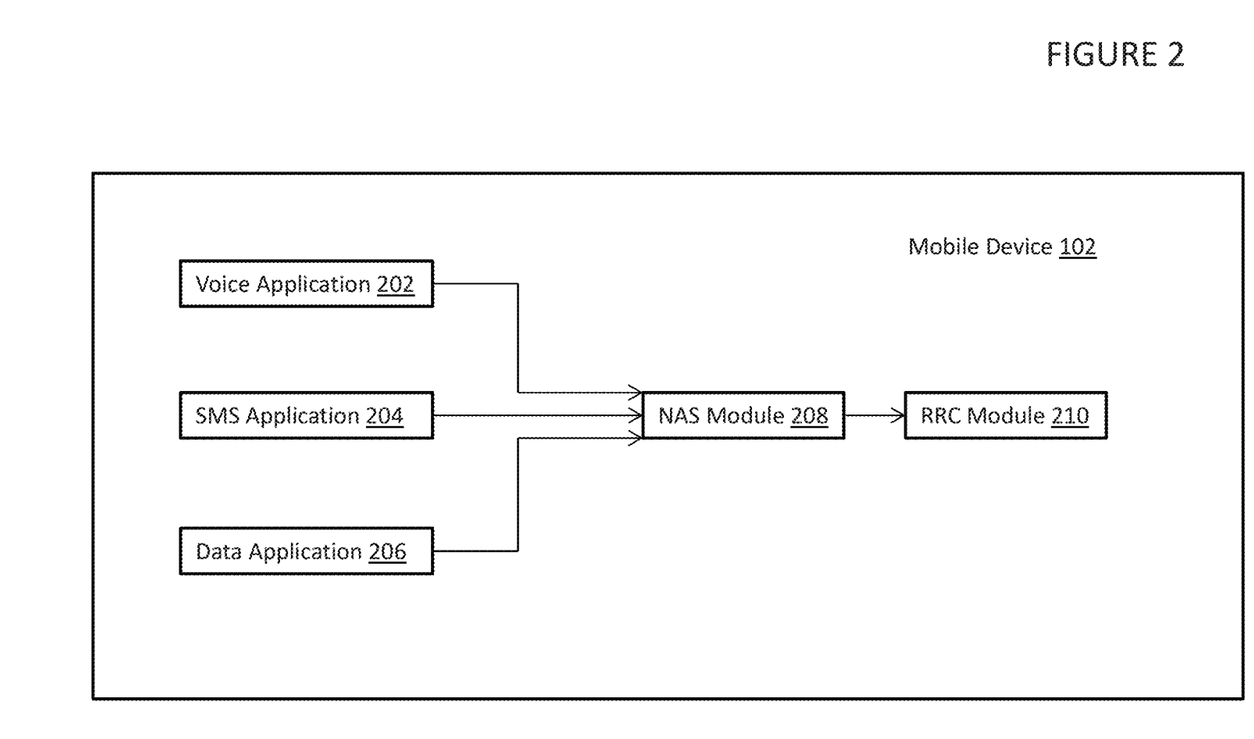
FIG. 2 is an example mobile device for managing connection retries.

FIG. 2 is a block diagram of an example mobile device 102 configured to prevent a retry of a connection request that was access class barred. For example the mobile device 102 may substantially align a retry timer for a connection request to an access-class-barring timer. The device 102 includes a plurality of device applications 202, 204, 206, a NAS module 208, and an RRC module 210. The device applications include a voice application 202 (e.g., telephony application), an SMS application 204, and a data application 206 (e.g., an electronic mail application, a web browser application) that communicate with, for example, the eNB 112a illustrated in FIG. 1. The device applications 202, 204, 206 may be software applications stored in a memory sub-system and executed by a processing sub-system. For example, the device applications may be stored in the flash memory, RAM, or a combination thereof and executed by the microprocessor, digital signal processor (DSP), or a combination thereof of the device 102.

The user application 202, 204, 206 can include any hardware, software, firmware, or combination thereof for preventing a retry of a connection request that was access class barred. As mentioned above, the applications 202, 204, 206 or the NAS module 208 may substantially align a retry timer for one of the applications 202, 204, 206 with an access-class-barring timer for the RRC module 210. For example, the NAS module 208 may receive a service request from the application 202, 204, or 206 and, in response to the request, send an RRC connection establishment request to the RRC module 210. In some implementations, the NAS module 208 may determine a type of MO traffic for the application 202, 204, or 206 and indicate the traffic type to the RRC module 210. In response to a failure or a rejection from the RRC module 210, the user application 202, 204, 206 may prevent a retry of the connection request until expiration of the access-class-barring timer. When the retry timer and the access-class-barring timer are aligned, the retry timer and the access-class-barring timer can timeout at substantially the same time. In some implementations, a retry can be prevented using one or more of the following: informing the user application 202, 204, or 206 of a timeout value for the access-class-barring timer; having the user application 202, 204, or 206 to request the timeout value directly from the RRC module 210 or the RRC module 210 via the NAS module 208; in response to expiration of the timer, having the RRC module 210 automatically triggering a retry of the connection request; or others. For barring due to MO data, the NAS module 208 or the user application 202, 204, 206 can substantially align the retry timer with T303. For barring due to CSFB, the NAS module 208 or the user application 202, 204, 206 can substantially align the retry timer with T306 and T303. For barring due to MO signaling, the NAS module 208 or the user application 202, 204, 206 can substantially align the retry timer with T305.

In general, the NAS module 208 includes any hardware, software, firmware, or combination thereof for communicating with, for example, the eNB 112a. In other words, the NAS module 208 applies the wireless protocols to interface the application layers 202, 204, 206 with the eNB 112a. The NAS module 208 can be a functional layer in the protocol stack for communication between an access network and the mobile device 102, which supports signaling and traffic between the access network and the mobile device 102. The NAS protocols may not be specific to a particular radio access technology (RAT). In an evolved packet system (EPS), the NAS protocols can include mainly protocols for mobility management and session management between mobile device 102 and the mobility management entity (MME). In an example, the AS layer and/or NAS layer processing and/or signaling can be provided by a modem module (or device).

The RRC module 210 can include any hardware, software, firmware, or combination thereof for executing checks for access class barring. For example, the RRC module 210 may receive an RRC connection request from the NAS module 208 and perform the access baring check according to the traffic type or access class to determine whether the cell is barred. If the cell is barred the RRC module 210 starts the appropriate access-class-barring timers if not currently active and sends a notification of a failure or rejection to the NAS module 208. In some instances, the RRC module 210 may send the timeout value to the NAS module 208 with the rejection or in response to a request. In some implementations, the user applications 202, 204, 206 may query the RRC module 210 directly to determine the retry time to align with the access-class-barring timer expiry.

In general, the RRC module 210 includes the access stratum manager software and any associated hardware for interfacing the eNB 112a with the NAS module 208. The RRC module 210 is operable to establish a communication link between the NAS module 208 and the eNB 112a. In addition, the RRC module 210 is further operable to maintain the communication link between the NAS module 208 and the eNB 112a. For example, RRC module 210 can include protocols specific to a particular radio access technology (RAT), such as long term evolution (LTE) and third generation (3G) and second generation (2G) digital wireless technology. 2G wireless technology can include cellular telecom protocols using the global system for mobile communications (GSM) standard. GSM (originally groupe special mobile) is a standard set developed by the European Telecommunications Standards Institute (ETSI) to describe protocols for second generation (2G) digital cellular networks used by wireless devices (e.g., mobile phones). 3G wireless technology can include protocols that comply with the international mobile telecommunications-2000 (IMT-2000) specifications by the international telecommunication union, such as universal mobile telecommunications system (UMTS), code division multiple access 2000 (CDMA2000), and Worldwide interoperability for Microwave Access (WiMAX). UTMS is a 3GPP radio access technology for networks using wideband-code division multiple access (W-CDMA). CDMA2000 uses code division multiple access (CDMA) channel access to send voice, data, and signaling data between wireless devices (e.g., mobile phones) and cell sites. 3G wireless technology can provide applications in wireless voice telephony, mobile Internet access, fixed wireless Internet access, video calls and mobile television (TV).

Figure 3:
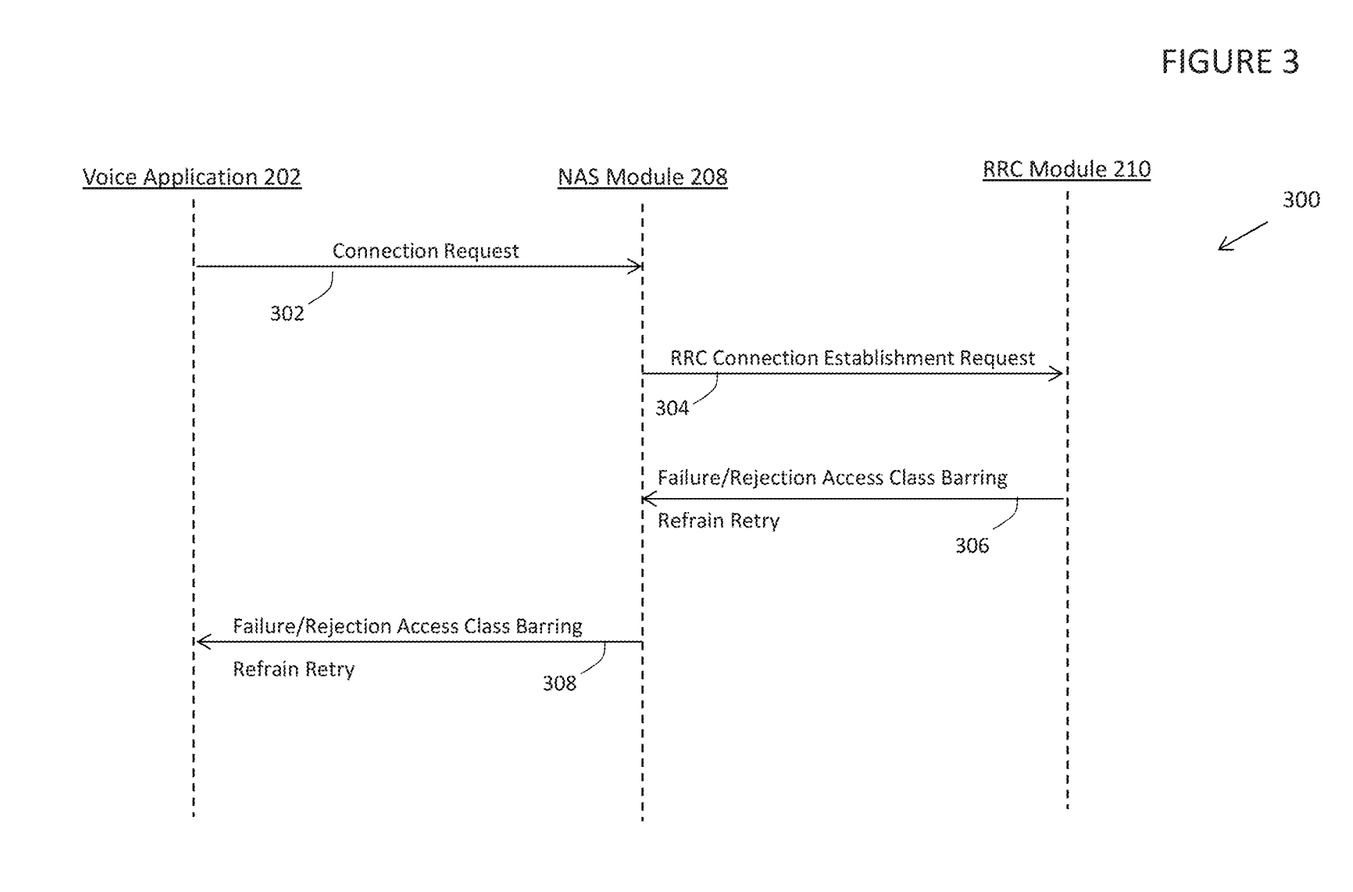
FIG. 3 is a call flow for managing connection retries for a voice application.

FIG. 3 illustrates a call flow 300 for managing a retry for voice-call connection request. In particular, the voice application 202 sends a connection request 302 to the NAS module 208. The connection request 302 may comprise a request to initiate a Circuit-switched voice call (CSFB voice call). In response to the request, the NAS module 208 sends an RRC connection establishment request 304 to the RRC module 210. In some implementations, the NAS module 208 determines a type of traffic for the voice application 202 and indicates the traffic type to the RRC module 210. If the access class barring check fails, the RRC module 220 sends an indication 306 of a failure or rejection due to access class barring. In some implementations, the RRC module 210 may indicate a timeout value to the NAS module 208. The NAS module 208 sends a notification 308 of the failure or rejection to the voice application 202 and the voice application restrains the retry until after expiration of the access-class-barring timer of the RCC module 210. For example, the NAS module 208 may send the timeout value to the voice application 202 such that the voice application 202 sets a retry timer to expire at the timeout value. In some implementations, the voice application requests or extracts the timeout value from NAS module 208 or the RRC module 210.

Figure 4:
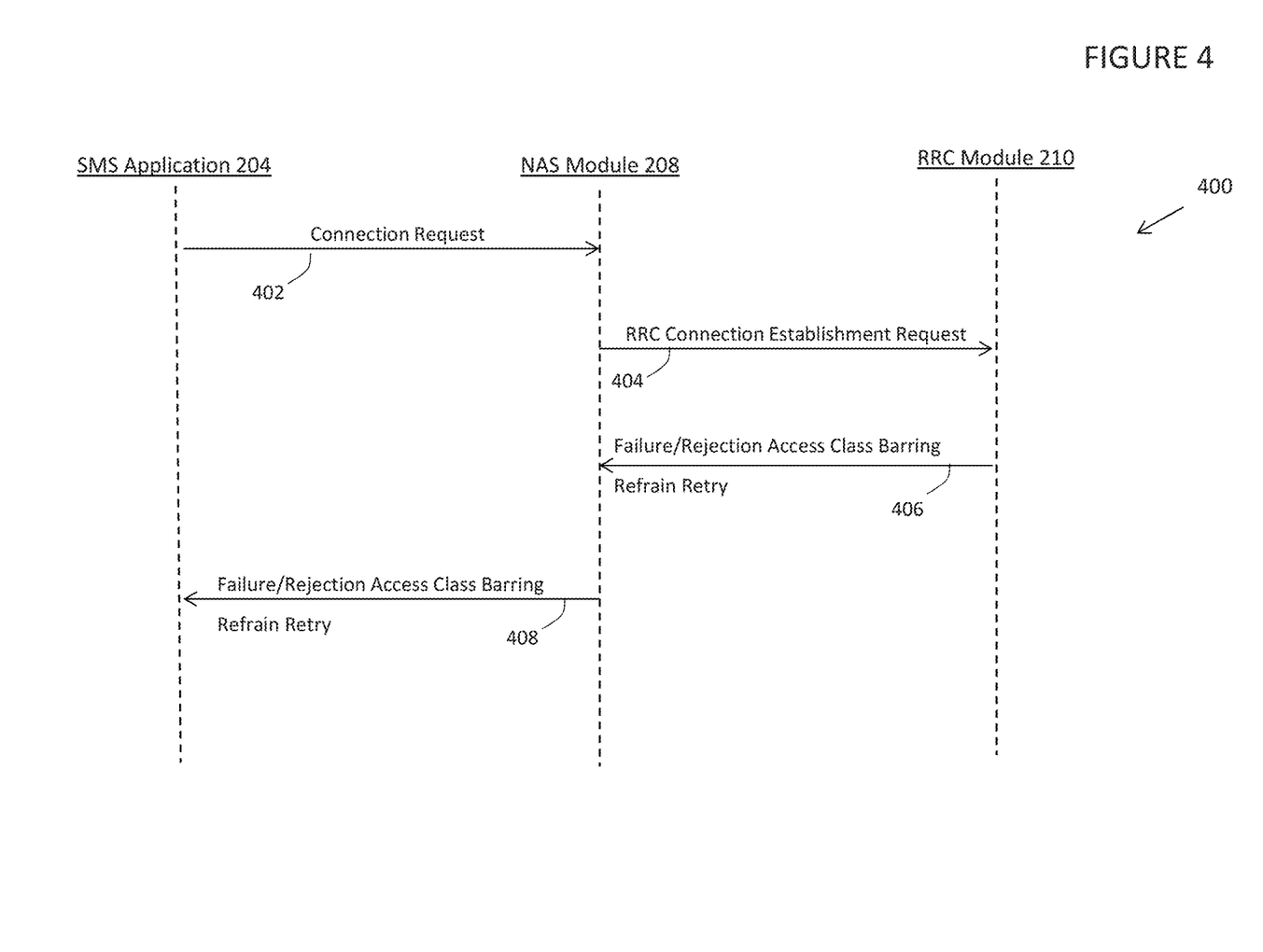
FIG. 4 is a call flow for managing connection retries for an SMS application.

FIG. 4 illustrates a call flow 400 for managing a retry for SMS connection request. In particular, the SMS application 204 sends a connection request 402 to the NAS module 208. The connection request 402 may comprise a request to send an SMS message. In response to the request, the NAS module 208 sends an RRC connection establishment request 404 to the RRC module 210. In some implementations, the NAS module 208 determines a type of traffic for the SMS application 204 and indicates the traffic type to the RRC module 210. In response to performing the access barring check, the RRC module 220 sends an indication of a failure or rejection due to access class barring. In some implementations, the RRC module 210 may indicate a timeout value to the NAS module 208. The NAS module 208 sends a notification of the failure or rejection to the SMS application 204 and the SMS application 204 restrains a retry until after expiration of the access-class-barring timer for the RCC module 210. For example, the NAS module 208 may send the timeout value to the SMS application 204 such that the SMS application 204 sets a retry timer to expire at the timeout value.

Figure 5:
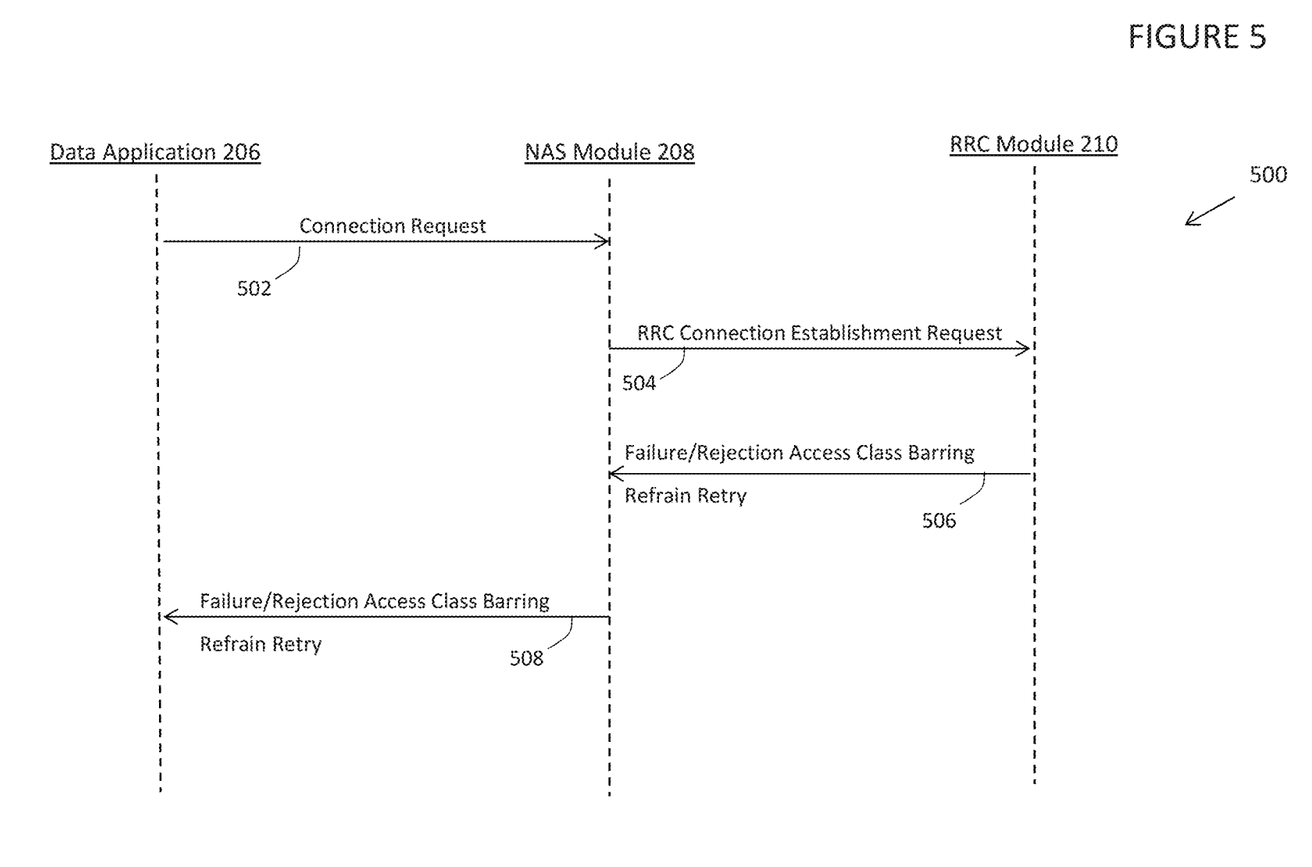
FIG. 5 is a call flow for managing connection retries for a data application.

FIG. 5 illustrates a call flow 500 for managing a retry for data connection request. In particular, the data application 206 sends a connection request 502 to the NAS module 208. The connection request 502 may comprise a request to initiate a data connection. In response to the request, the NAS module 208 sends an RRC connection establishment request 504 to the RRC module 210. In some implementations, the NAS module 208 determines a type of traffic for the data application 206 (e.g., user data, signaling) and indicates the traffic type to the RRC module 210. In response to performing the access class barring check, the RRC module 220 sends an indication of a failure or rejection due to access class barring 506. In some implementations, the RRC module 210 may indicate a timeout value to the NAS module 208. The NAS module 208 sends a notification of the failure or rejection to the data application 206 and the data application 206 restrains a retry of the connection request until after expiration of the access-class-barring timer of the RRC module 210. For example, the NAS module 208 may send the timeout value to the data application 206 such that the data application 206 sets a retry timer to expire at the timeout value.

Figure 6:
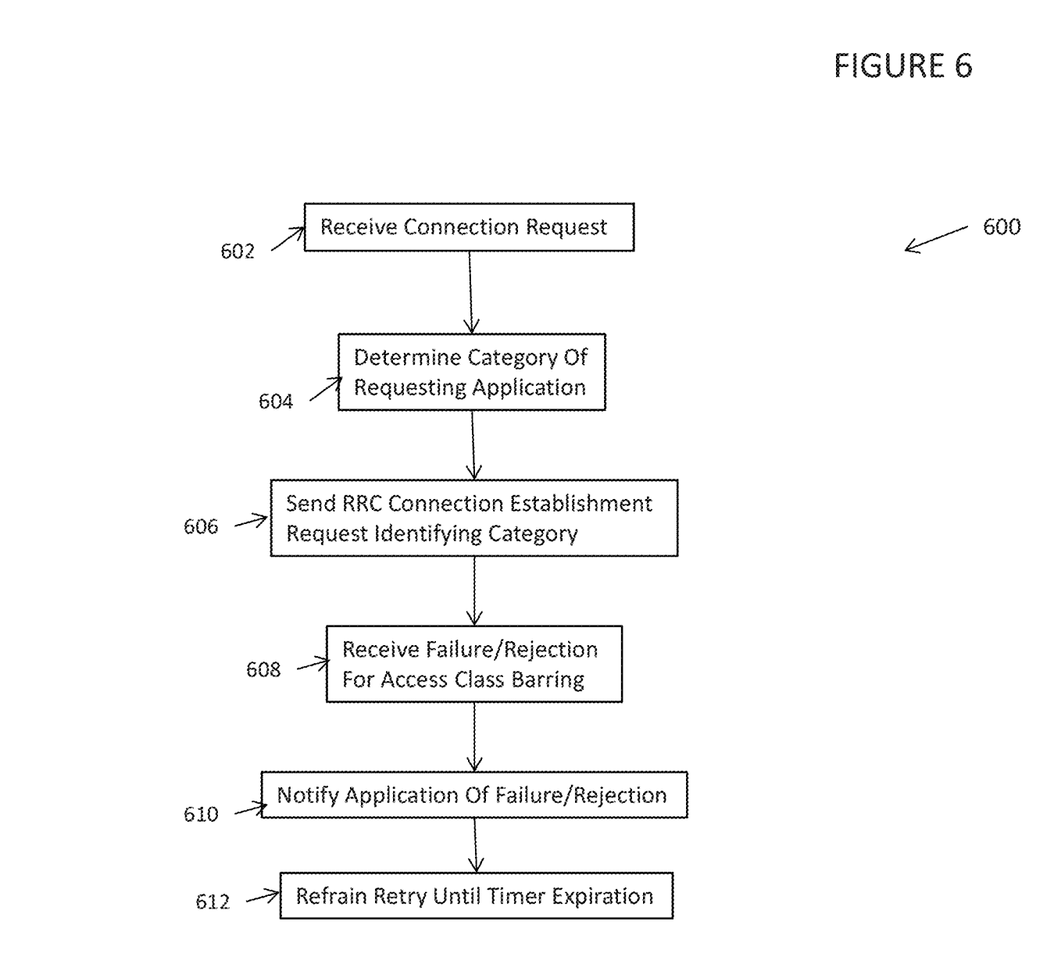
FIG. 6 is a flow chart illustrating an example method for refraining retries until expiration of an access-class-barring timer.

FIG. 6 is a flowchart illustrating a method 600 for preventing a retry of a connection request for a user application until expiration of a timer for access class barring. Method 600 begins at step 602 where a connection request is received. For example, the NAS module 208 in FIG. 2 may receive a connection request form voice application 202 requesting establishment of a connection for a voice call. At step 604, a category for the requesting application is determined by the application or entity requesting the connection. For example, the NAS module 208 may determine the category of the voice application 202 such as CSFB. Next, at step 606, an RRC connection establishment request that identifies the category is sent. Returning to the example, the NAS module 208 may send an RRC connection establishment request to the RRC module 210 that identifies the type of connection requested. At step 608, a failure or a rejection for access class barring is received. As for the example, the NAS module 208 receives, from the RRC module 210, a notification of a failure or rejection for access class barring. In some implementations, the notification includes a timeout value for the access-class-barring timer. In some implementations, the application is notified, at step 610, that the connection request has failed or been rejected. Next, at step 612, a retry of the connection request is refrained until expiration of the access-class-barring timer. In the example, the NAS module 208 may send the timeout value to the voice application 202 in which case the voice application 202 can set expiration of the retry timer to the timeout value.

Figure 7:
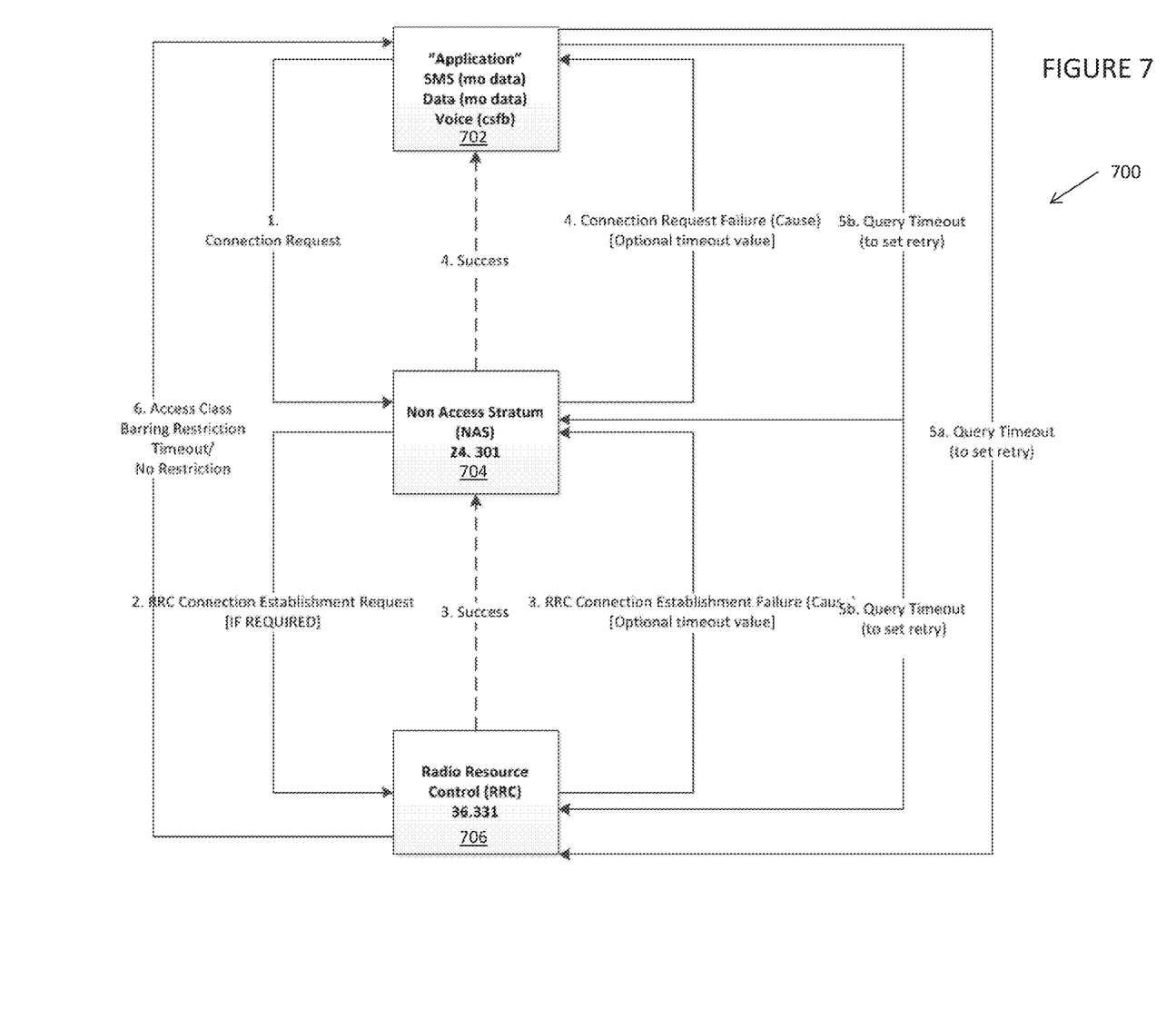
FIG. 7 is a flow diagram for managing for managing a connection retry due to access class barring.

FIG. 7 illustrates a flow diagram 700 for managing a retry for a connection request. At step 1, the application 702 sends a connection request to the NAS 704. For example, the request may be to send data or an SMS, start a voice call, execute CSFB, or other. At step 2, the NAS 704 sends, to the RRC 706, a request to create an RRC connection if one does not already exist. The RRC 706 executes an access-class-barring check, if necessary, and establishes an RRC connection if the access-class-barring check succeeds, which is indicated with the dashed line at step 3. If the access-class-barring check fails (or for another reason), the RRC 706 sends an RRC connection establishment failure, including the cause, to the NAS 704, which is indicated with a solid line in step 3. If the connection was successful, the NAS 704 sends a successful notification to the application 702, which is indicated by a dashed line at step 4. If unsuccessful, the NAS 704 sends a connection request failure, including the case, to the application 702, which is indicated by a solid line at step 4. In some implementations, the NAS 704 can send the timeout value for the access-class-barring timer to the application 702. In other implementations, the application 702 may directly request the timeout value directly from the NAS 704, and in response, the NAS 704 requests the timeout value from the RRC, which is illustrated at step 5a. In some instances, the application 702 may directly request the timeout value from the RRC 706. At step 6, the RRC 706 may directly send an indication of access-class-barring timer timeout to the application 702, which can trigger a retry.

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising:
generating, by a mobile device, a service request, in response to a connection request from a user application;
in response to the service request:
   determining a type of mobile originating (MO) traffic among a plurality of types of MO traffic for the user application generating the connection request, wherein each one of the plurality of types of MO traffic corresponds to one of a plurality of access-class-barring timers;
   performing, by the mobile device, an access class barring check to determine that access to a network for the connection request is barred based on the type of MO traffic;
   receiving, from a radio resource control (RRC) module of the mobile device, an indication of failure of or a rejection to the service request due to access class barring; and
   in response to receiving the indication of failure or the rejection,
      determining an access-class-barring timer of the RRC module based on the type of MO traffic for the user application generating the connection request;
      preventing a retry of the service request until expiration of the access-class-barring timer of the RRC module; and
      determining a timeout value based on the access-class-barring timer, wherein the access-class-barring timer is used to bar access to the network, wherein preventing the retry of the service request comprises aligning a retry timer to the access-class-barring timer, and wherein the retry timer is a different timer from the access-class-barring timer; and
   sending, from the mobile device to the user application, the timeout value that is determined based on the access-class-barring timer.

2. The method of claim 1, wherein preventing the retry of the service request comprises, in response to expiration of the access-class-barring timer, automatically triggering a retry of the service request.

3. The method of claim 1, wherein the user application comprises at least one of a data application, a short messaging service (SMS) application, or a voice application.

4. The method of claim 1, wherein the access-class-barring timer comprises at least one of T303, T305, or T306.

5. A mobile device, comprising:
one or more processors configured to:
   generate, by the mobile device a service request in response to a connection request from a user application;
   in response to the service request:
      determine a type of mobile originating (MO) traffic among a plurality of types of MO traffic for the user application generating the connection request, wherein each one of the plurality of types of MO traffic corresponds to one of a plurality of access-class-barring timers;
      perform, by the mobile device, an access class barring check to determine that access to a network for the connection request is barred based on the type of MO traffic;
      receive, from a radio resource control (RRC) module of the mobile device, an indication of failure of or a rejection to the service request due to access class barring; and
      in response to receiving the indication of failure or the rejection,
         determine an access-class-barring timer of the RRC module based on the type of MO traffic for the user application generating the connection request;
         prevent a retry of the service request until expiration of the access-class-barring timer of the RRC module; and
         determine a timeout value based on the access-class-barring timer, wherein the access-class-barring timer is used to bar access to the network, wherein preventing the retry of the service request comprises aligning a retry timer to the access-class-barring timer, and wherein the retry timer is a different timer from the access-class-barring timer; and
      send, from the mobile device to the user application, a timeout value that is determined based on the access-class-barring timer.

6. The mobile device of claim 5, wherein the one or more processors configured to prevent the retry of the service request comprises the one or more processors configured to inform the user application that the access-class-barring timer started.

7. The mobile device of claim 5, wherein the one or more processors configured to prevent the retry of the service request comprises the one or more processors configured to, in response to expiration of the access-class-barring timer, automatically trigger a retry of the service request.

8. The mobile device of claim 5, wherein the user application comprising at least one of a data application, a short messaging service (SMS) application, or a voice application.

9. The mobile device of claim 5, wherein the access-class-barring timer comprises at least one of T303, T305, or T306.

10. A non-transitory computer-readable medium storing computer instructions, that when executed by one or more hardware processors, cause a computing device to perform operations comprising:
generating a service request, in response to a connection request from a user application;
in response to the service request:
   determining a type of mobile originating (MO) traffic among a plurality of types of MO traffic for the user application generating the connection request, wherein each one of the plurality of types of MO traffic corresponds to one of a plurality of access-class-barring timers;
   performing an access class barring check to determine that access to a network for the connection request is barred based on the type of MO traffic;
   receiving, from a radio resource control (RRC) module of the computing device, an indication of failure of or a rejection to the service request due to access class barring; and
   in response to receiving the indication of failure or the rejection,
      determining an access-class-barring timer of the RRC module based on the type of MO traffic for the user application generating the connection request;

preventing a retry of the service request until expiration of an access-class-barring timer of the RRC module; and determining a timeout value based on the access-class-barring timer, wherein the access-class-barring timer is used to bar access to the network, wherein preventing the retry of the service request comprises aligning a retry timer to the access-class-barring timer, and wherein the retry timer is a different timer from the access-class-barring timer; and sending, from the computing device to the user application, the timeout value that is determined based on the access-class-barring timer.

11. The non-transitory computer-readable medium of claim 10, wherein preventing the retry of the service request comprises, in response to expiration of the access-class-barring timer, automatically triggering a retry of the service request.

12. The non-transitory computer-readable medium of claim 10, wherein the user application comprises at least one of a data application, a short messaging service (SMS) application, or a voice application.

13. The non-transitory computer-readable medium of claim 10, wherein the access-class-barring timer comprises at least one of T303, T305, or T306.

* * * * *

UNITED STATES PATENT AND TRADEMARK OFFICE
CERTIFICATE OF CORRECTION

| | | |
|---|---|---|
| PATENT NO. | : 11,552,902 B2 | Page 1 of 1 |
| APPLICATION NO. | : 15/078815 | |
| DATED | : January 10, 2023 | |
| INVENTOR(S) | : Wirtanen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this
Fourteenth Day of January, 2025

Derrick Brent
*Acting Director of the United States Patent and Trademark Office*